Oct. 31, 1967 C. K. HITZ 3,349,942
NESTING BASKET AND CARRIER COMBINATION
Filed June 1, 1965

INVENTOR.
BY CARSON K. HITZ,
ATTORNEYS

United States Patent Office 3,349,942
Patented Oct. 31, 1967

3,349,942
NESTING BASKET AND CARRIER COMBINATION
Carson K. Hitz, 435 W. Maple St.,
Granville, Ohio 43023
Filed June 1, 1965, Ser. No. 460,296
4 Claims. (Cl. 220—19)

ABSTRACT OF THE DISCLOSURE

Wire basket having converging side wall members, and carrier therefor having handle members paralleling the converging members of the basket side walls, and spaced with respect to the converging members of the side walls to permit nesting of a plurality of basket-carrier combinations.

Background of the invention

This invention relates generally to baskets or other containers provided with a removable carrier, and more particularly to the combination of a basket and removable carrier so constructed as to permit nesting of a plurality of the baskets or the like with the carrier in place.

It is abundantly old in the art to design a basket or other container so that a plurality of such containers can be nested one within the other, for storage and transportation.

It is also old in the art to provide a removable carrier for use with such a basket. However, if the baskets or containers themselves were designed to be nesting, the prior art has not been able to provide a basket or plurality of baskets which can still be nested when the removable carrier is in place. This is very undesirable from several standpoints. For example, if a large number of empty baskets or containers are to be returned, the inability to nest the baskets containing the carriers means that at least two separae bundles must be returned; i.e. one bundle of the nested baskets, and a separate bundle of the removable carriers.

Accordingly, it is a primary object of this invention to provide a basket so designed that a plurality of identical baskets can be nested one within the other.

A further object of the invention is to provide in combination, a removable carrier which can be used with a basket of the character described above, the cooperation between the basket and carrier being such that a plurality of basket and carrier combinations can be nested one within the other.

Still a further object of the invention is to provide such a basket and carrier combination which can be fabricated by using conventional techniques, and hence can be manufactured inexpensively.

Description of the drawing

Numerous other objects and advantages of this invention will become apparent to the skilled worker in the are upon reading this specification. To facilitate an understanding of the invention, an exemplary embodiment will now be described in detail, with particular reference to the accompanying drawings, in which.

Figure 1:
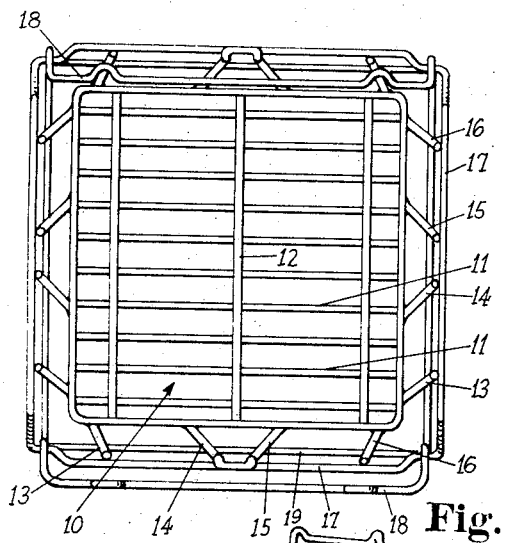
FIGURE 1 is a perspective view as seen from above of the basket of this invention.
Figure 3:
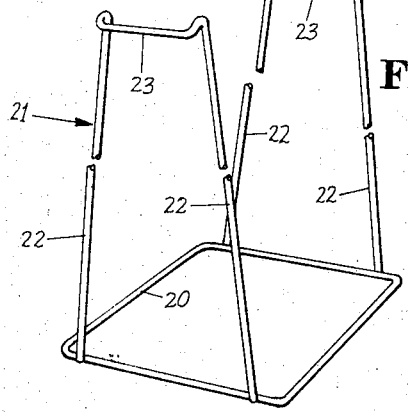
FIGURE 3 is a perspective view of the basket of this invention.

Referring now particularly to FIGURES 1 and 3, the basket of this invention includes a bottom indicated generally at 10; in the embodiment shown, the bottom is formed of the crossed rods or wires 11 and 12, which may be suitably secured together as by spot welding or the like.

Figure 2:
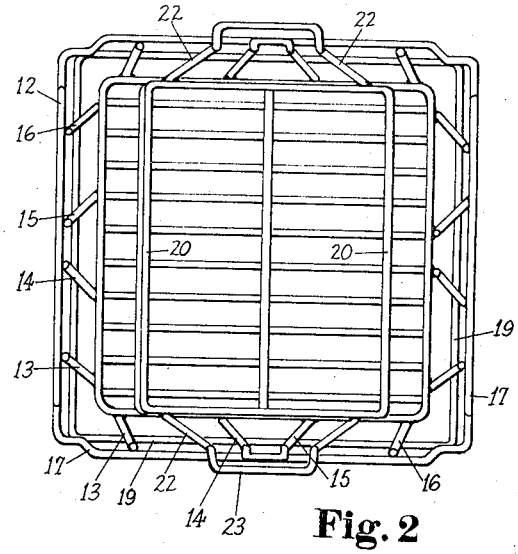
FIGURE 2 is a perspective view as seen from above of the basket and carrier combination of this invention.

Secured to the four sides of the bottom 10 are the side walls of the container. Each of the side walls include four generally vertical members 13, 14, 15, and 16. These vertical members 13–16 taken together define a plane which is perpendicular to the bottom 10 of the basket. (It should be noted at this time that FIGURES 1 and 2 are somewhat deceptive, in that it appears that the side walls of the basket slope inwardly toward the bottom. It must be emphasized that this is not the case, and that this appearance is simply the result of a foreshortening effect when viewing the basket in perspective.)

It will be noted that the inner two of the vertical members, 14 and 15, are non-parallel; specifically, the diverging ends of these vertical members are secured to the bottom 10 of the basket. The outer two vertical members 13 and 16 are generally parallel respectively to the adjacent inner vertical member.

Each of the side walls of the basket shown in FIGURES 1 and 3 also include a generally horizontal member 17, which, as clearly shown in FIGURE 1, is secured to the outside of each of the vertical members 13–16 of its respective side wall. It will also be noted that the ends of the horizontal member 17 are joined to the ends of the horizontal member of the adjacent side wall. In the embodiment shown, it will be obvious that the four vertical members 17 have been formed from a single length of rod or wire.

The basket shown in FIGURES 1 and 3 also includes the movable handle 18. Handles of this type are well known in the art, and do not as such form a part of this invention. The utility of the handles will be explained hereinafter.

Considering the basket described above alone, it will be apparent that a plurality of identical baskets can be nested one within the other, even though the side walls of each are perpendicular to its bottom, by virtue of the angular relationship of the vertical members of these side walls, and the location of the top horizontal member 17. It has been found in actual practice that baskets as described above can be forced together in wedging relationship, so that it is very difficult to separate them. To this end, each side wall of each basket is provided with a horizontal stop member 19. When one basket is placed within another basket, they will nest until the horizontal stop member 19 of the top basket bears upon the horizontal member 17 of the next lower basket. This will prevent any corresponding pair of vertical members (for example members 14 and 15 of the lower basket, and members 14 and 15 of the upper basket) from wedging tightly into engagement.

Turning now to FIGURE 3, the removable carrier designed for use with the basket described above has been illustrated. This removable carrier includes a rectangular bottom frame 20. It will be noted that this bottom is of a size to at least fit within the side walls of the basket described above, while maintained in a plane parallel to the bottom of the basket. Secured to opposite sides of the bottom frame 20 of the carrier are the handle members indicated generally at 21. Each of the handle members 21 includes a pair of vertical arms 22; these vertical arms together define a plane perpendicular to the bottom frame of the carrier, and are generally parallel respectively to the vertical members 14 and 15 of the side wall of the basket.

The uppermost ends of the handle members 21 terminate in the outwardly extending handle grip portions 23, which enable the carrier to be readily inserted and removed from the basket described above.

Figures 4, 5:
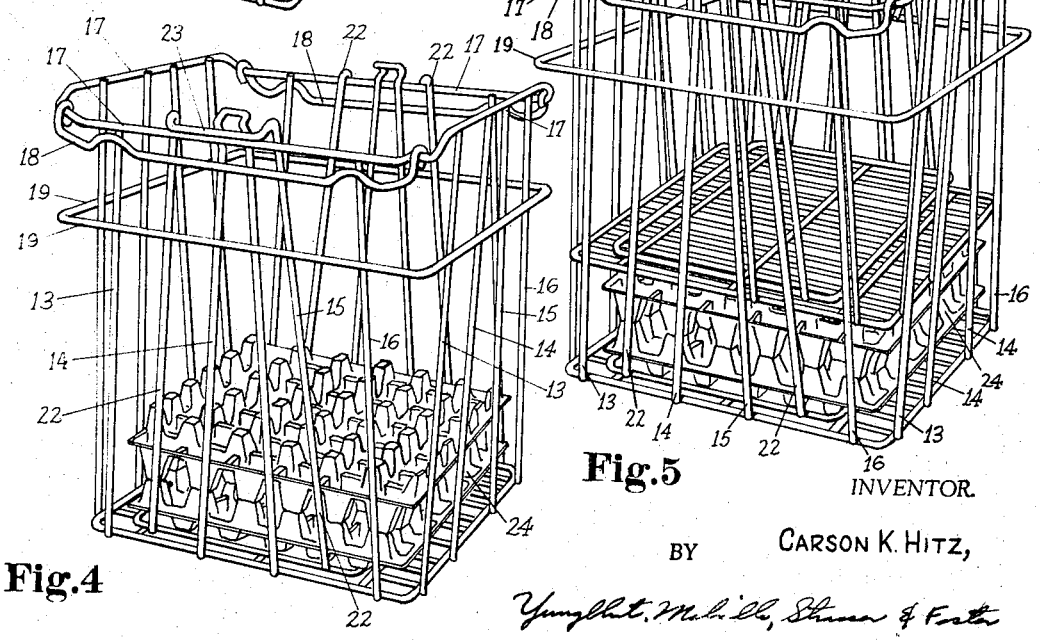
FIGURE 4 is a perspective view of the carrier of the invention illustrated alone.
FIGURE 5 is a perspective view illustrating a basket with its removable carrier in place, and showing a second basket nested within the first basket and carrier.

The exemplary embodiment of the invention shown in the drawings is specifically a basket and carrier designed for the collection, handling, and transporting of eggs. To this end, a "filler flat" of paper or the like formed to provide a plurality of pockets for holding eggs, is placed on the bottom frame 20 of the carrier. (A plurality of filler flats have been indicated at 24 in FIGURE 4.) This first filler flat on the carrier is filled with eggs, a second filler flat stacked on top of the first layer of eggs, and so on. When the carrier is full, it may be placed in the basket as shown in FIGURE 4. The thus loaded baskets are then shipped by any suitable means to the egg processor. It may be noted at this time that the pivotal handle members 18 mentioned earlier are so designed that when moved from the position shown in FIGURE 4 to a position extending inside the confines of the basket, a plurality of baskets may be stacked one on top of the other, the bottom of each upper basket being supported on the handles 18 of the next lower basket.

When the eggs have been removed by the processor or dealer, and the baskets, carriers, and filler flats are to be returned to the producer, each carrier can be placed within its basket, along with the proper number of filler flats. A second basket similarly arranged may be nested within the first basket-carrier combination, as clearly shown in FIGURE 5. The various parts of the upper basket are distinguished from the corresponding part of the lower basket by the addition of a prime sign to the reference numbers, e.g. 14'. This arrangement is of great practical importance, and has permitted great economies in utilizing permanent or returnable wire baskets.

To permit nesting of the basket carrier combination, it is necessary that the shortest distance between the vertical arms 22 of the carrier member be greater than the longest distance between the innermost vertical members 14 and 15 of the basket. That is, when the carrier is in place in the basket as shown in FIGURE 4, the lowermost ends of the vertical members 14' and 15' of the basket to be nested within the first combination must fit between the arm 22 and end member 14, and between the member 15 and other arm 22 respectively.

For some uses, it is desirable to provide some means to insure that the carrier is properly centered in the basket, so that nesting is facilitated. This can be accomplished in various ways; for example, the rectangular bottom 20 of the carrier can be made of a size which closely approaches the internal dimensions of the basket itself.

As indicated earlier in the specification, each of the side walls of each basket of this invention is preferably provided with a horizontal stop rod 19. This will insure, in the specific embodiment illustrated, that the bottoms of any two nested baskets will be spaced apart by a distance equal to the distance between the horizontal member 17 and the horizontal stop 19 of any given side wall. This also permits the stacking of a plurality of filler flats 24 within each basket, without interferring with its nesting qualities.

Numerous modifications may be made in this invention without departing from its scope and spirit. For example, the embodiment of the invention described above, illustrate the vertical members of the side wall having their diverging ends secured to the bottom of the basket. It will be apparent that so long as the relationship set out earlier in this specification are observed, the converging ends of the vertical members can be secured to the bottom of the basket. Also, the above described construction is useful in non-nesting baskets and carrier assemblies. Accordingly, no limitations are to be inferred from the exemplarly description, except insofar as specifically pointed out in the claims which follow:

The embodiments of the invention in which an exclusive property or privilege is claimed are defined as follows:

1. In combination:
   (a) a wire basket having a bottom and two pairs of opposing side walls, one of said pairs of side walls being shorter than the other of said pair of side walls, each of said side walls including:
      (i) at least two converging members defining a plane perpendicular to said bottom, and
      (ii) a horizontal member parallel to said bottom and spaced upwardly therefrom, said horizontal member being secured to the outside of said converging members, the ends of said horizontal member being joined to the ends of the horizontal members of the adjacent side walls, and
   (b) a carrier nestable within said basket, said carrier including;
      (i) a bottom of a size to fit within said side walls of said basket in a plane parallel to said bottom of said basket, and
      (ii) a pair of handle members secured to opposite sides of said bottom of said carrier, each said handle member comprising two vertical arms, said vertical arms defining a plane perpendicular to said bottom of said carrier, and being generally parallel respectively to said converging members of said basket, the shortest distance between said vertical arms being greater than the longest distance between said vertical members of said side walls, whereby a second basket, identical with said above mentioned basket, may nest within said basket and carrier combination.

2. The combination claimed in claim 1, wherein the diverging ends of said converging members of said side walls of said basket are secured to said bottom of said basket.

3. The combination claimed in claim 2, wherein the length of said handle members is greater than the length of said pair of shorter side walls of said basket, said handle members terminating in a handle grip portion extending outwardly a distance greater than the thickness of said horizontal member of said basket, whereby when said carrier is nested within said basket, said handle grip portion may be readily grasped for removing said carrier from said basket.

4. In combination with a plurality of wire baskets, each having a bottom and side walls, each said side wall of said baskets including at least two converging members defining a plane perpendicular to said bottom and a horizontal member parallel to said bottom and spaced upwardly therefrom, said horizontal member being secured to the outside of said converging members, the ends of said horizontal member being joined to the ends of the horizontal members of the adjacent side walls; a carrier nestable within said basket, said carrier comprising:

(a) a bottom of a size to fit within said side walls of said basket in a plane parallel to said bottom of said basket, and (b) a pair of handle members secured to opposite sides of said bottom of said carrier, each said handle member comprising two vertical arms, said vertical arms defining a plane perpendicular to said bottom of said carrier and arranged generally parallel respectively to said converging members of said basket, the shortest distance between said vertical arms being greater than the longest distance between said converging members of said side wall, whereby said plurality of wire baskets, each containing the above mentioned carrier, may be nested within each other.

References Cited

UNITED STATES PATENTS

| | | |
|---|---|---|
| 2,191,061 | 2/1940 | Potts. |
| 2,361,351 | 10/1944 | Kollmon _____ 220—95 |
| 2,381,253 | 8/1945 | Bierwert _____ 220—17 X |
| 2,401,063 | 5/1946 | Fordon _____ 220—97 |
| 2,803,369 | 8/1957 | Fleetwood _____ 220—97 X |
| 3,037,659 | 5/1962 | Fredrick _____ 220—97 X |

THERON E. CONDON, *Primary Examiner.*

GEORGE E. LOWRANCE, *Examiner.*